(No Model.)
J. T. CAPERS.
GRINDING MILL.
No. 514,642.　　　　　　　　　　Patented Feb. 13, 1894.
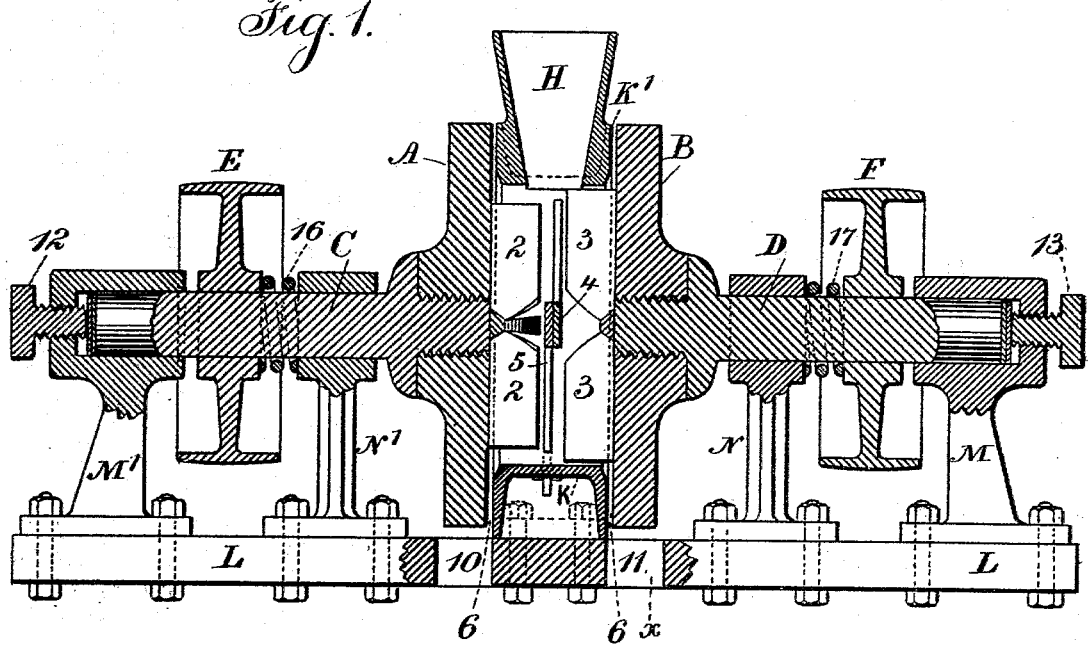
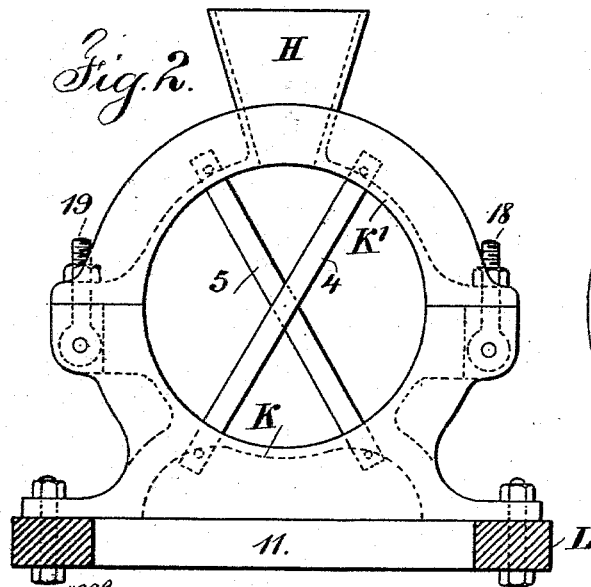
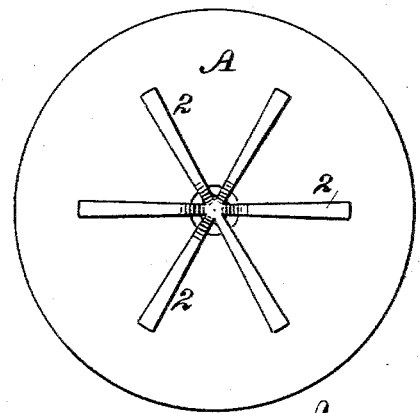
Witnesses
Chas. H. Smith
Geo. T. Pinckney
Inventor
Julius T. Capers
per Lemuel W. Serrell
Atty

UNITED STATES PATENT OFFICE.

JULIUS T. CAPERS, OF CHARLESTON, SOUTH CAROLINA.

GRINDING-MILL.

SPECIFICATION forming part of Letters Patent No. 514,642, dated February 13, 1894.

Application filed August 26, 1893. Serial No. 484,086. (No model.)

*To all whom it may concern:*

Be it known that I, JULIUS T. CAPERS, a citizen of the United States, residing at Charleston, in the county of Charleston and State of South Carolina, have invented an Improvement in Grinding-Mills, of which the following is a specification.

This invention is especially designed for grinding phosphates but it may be employed in grinding other materials, such for instance as cement, lime, &c. Before my invention two disks had been made use of having radial flanges or wings, the disks being rotated in opposite directions and the material supplied through a hopper into an inclosed space between the disks. In my present improvement the disks with wings on their faces are opposite to each other and between them is a circular inclosure or ring having on the upper part a supply hopper, and radial or cross bars that coact with the wings to cut and break up the phosphate or other material, which when sufficiently fine escapes between the concaves that form the ring and the faces of the disks.

In the drawings, Figure 1 is a longitudinal section of my improved mill. Fig. 2 is an elevation of the concave and section of the bed at the line *x* Fig. 1. Fig. 3 shows the face of one of the disks detached.

The bed plate L is preferably of cast iron having holes through it at 10 and 11, and upon this bed plate are suitable head blocks or supports M N, M' N' and at the upper ends of these head blocks or supports are journal boxes or bearings carrying the shafts C D upon which are pulleys or gears E F by which such shafts C D are rotated in opposite directions, and upon the inwardly projecting ends of the shafts C D are the disks A B, preferably of cast iron or steel and having upon their surfaces projecting ribs 2 and 3 of suitable size and strength and adapted to act in breaking or crushing the phosphate or other material under treatment; and it is advantageous to make use of screws 12 and 13 in line with the axes of the shafts C D and passing through the bearings or boxes at the upper ends of the standards M M', so as to set up the disks A and B according to the fineness of the material that is ground, and it is advantageous to make use of springs around the shafts C D at 16 and 17 to press back the shafts and disks as the screws 12 and 13 may be slackened so as to separate the disks A and B to a greater or less extent.

The wings 2 and 3 do not extend to the edges of the disks A and B, and between these edges are the concaves K K', the concave K being bolted to the bed L and the concave K' resting upon the concave K and connected therewith by suitable bolts 18 and 19 which are preferably pivoted at their lower ends so as to swing into or out of action when the nuts on the bolts are slackened, and the upper concave K' carries the hopper H which opens through the concave to the space between the two disks A and B, and there are cross bars 4 and 5 preferably of steel, that extend across from one concave to the other and are permanently secured thereto at their respective ends.

It will now be apparent that pieces of phosphate or other material supplied through the hopper H drop down between the disks A and B which are to be rotating in opposite directions, and the concaves K. K'. form a complete stationary ring between the faces of the disks, and the bars 4. and 5. are nearly radial to such ring and the ring confines the pieces that are being broken, and the pieces are thrown violently about between the disks by the action of the wings and are cut and broken by the joint action of the wings and the radial bars, and when sufficiently fine, the material escapes at the spaces 6 between the concaves and the surfaces of the disks, and passes down through the openings 10 and 11 in the bed L, and such material can be reduced more or less by adjusting the screws 12 and 13; and I remark that the contiguous surfaces of the concaves and of the disks may either be smooth or more or less corrugated or grooved.

I claim as my invention—

1. The combination with the disks A and B, their shafts, supports and mechanism for rotating such disks in opposite directions, of the concaves K K' and cross bars 4 and 5, substantially as set forth.

2. The combination with the disks A and B having projecting wings and means for supporting and rotating such disks, of the cross bars 4 and 5 between such disks, and means for supporting the same, substantially as set forth.

3. The combination with the disks A and B having wings upon their surfaces, of the cross bars 4 and 5, the concaves K K' and hopper H, and means for adjusting the shafts endwise and varying the distance between the surfaces of the disks and the concaves, substantially as set forth.

4. The combination with two disks having wings upon their surfaces and means for rotating the same in opposite directions, of an intermediate stationary ring and radial or nearly radial bars within such ring against which the material is broken by the wings of the disk, substantially as specified.

Signed by me this 21st day of August, 1893.

JULIUS T. CAPERS.

Witnesses:
J. M. CAPER,
H. W. MITCHELL.